United States Patent Office 3,297,985
Patented Jan. 10, 1967

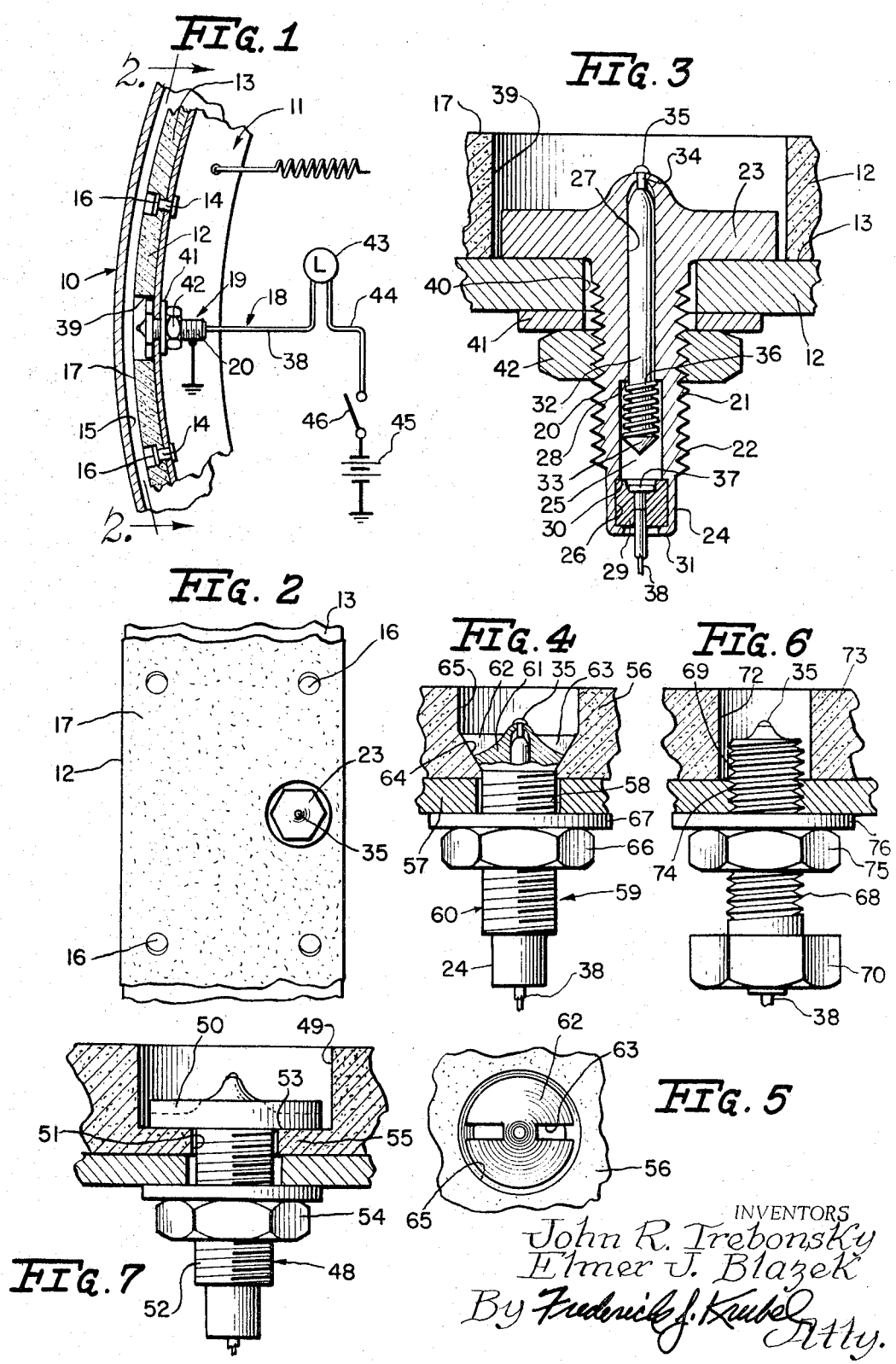

3,297,985
BRAKE LINING WEAR INDICATING MEANS
John R. Trebonsky, 4525 Cracow Ave., Lyons, Ill. 60534, and Elmer J. Blazek, 26 61st St., Downers Grove, Ill. 60515
Filed Apr. 14, 1964, Ser. No. 359,583
13 Claims. (Cl. 340—69)

This invention relates to a brake lining wear indicating means for motor vehicles and the like, and more particularly, to a new and improved safety alarm system for visually and/or audibly indicating to an operator when a brake shoe lining has been worn away to such an extent that it should be replaced to prevent scoring of the brake drum with which it is associated and to avoid the possibility of the vehicle being unknowingly operated with defective brakes.

In recent years automobile and truck manufactures have introduced self-adjusting brakes to the public and while such brakes offer many distinct advantages to the vehicle operator, certain serious drawbacks result from their use. Obviously, the time-consuming necessity of periodically adjusting the brakes as the brake shoe linings wear is obviated. However, the condition of the brake shoe linings were generally checked each time the brakes were adjusted and, consequently, with the elimination of brake adjustments in the vehicle maintenance schedule there is a tendency for the vehicle operator to be negligent in periodically inspecting the wear condition of the brake shoe lining. Furthermore, with conventional motor vehicle wheel brake arrangements comprising brake shoe sand a brake drum, inspection of the brake shoe linings requires disassembling of the vehicle wheel which involves an expense if the work is done by a skilled mechanic. It is, therefore, an important object of the present invention to provide a safety alarm system which can be readily and inexpensively incorporated in a motor vehicle wheel brake which is substantially simple in construction and fool-proof in operation, for positively and instantly warning the vehicle operator when a brake shoe lining has been worn to such an extent that further use will result in scoring of the brake drum and/or failure of the brake to take hold.

A still further object of the invention is the provision of a brake shoe lining wear indicating means of the above character which, because of its simplicity in construction, can be manufactured and installed at low cost, and is adapted to be incorporated in a conventional vehicle wheel brake system without extensive modification thereof and without adversely affecting the physical and functional characteristics of the brake lining.

Another object of the invention is to provide a brake shoe lining wear indicating system wherein an element of the system is also utilized to help fasten or secure the brake lining to the brake shoe without structurally impairing the attachment of the brake lining to the brake shoe or weakening the brake lining.

A still further object is to provide an electrical signalling or alarm circuit which is deenergized and does not consume electrical energy until the brake linig has been worn down a predetermined amount.

Heretofore, brake wear indicating apparatuses of the type to which the present invention relates generally included a contact pin which was part of an electrical circuit which also included the metal brake drum. The head of the contact pin was imbedded a predetermined amount below the drum-engaging surface of the brake lining and, consequently, the alarm circuit was deenergized until the brake lining wore down sufficiently to permit the contact pin head to physically and electrically contact the brake drum. Thus, it is obvious that the alarm would only be sounded during those times when the vehicle brakes were actually being applied by the vehicle operator. Furthermore, since it is well known that brake drum surfaces oftentimes become coated or glazed with the dirt, grease, oil and particles of the brake lining friction material, a good electrical contact between the contact pin head and the braking surface of the brake drum is not assured even though they are physically brought into engagement with each other. It is, therefore, another important object of the present invention to provide a brake lining wear indicating means which obviates the above-noted shortcomings of prior systems and which functions in a positive, fool-proof manner to indicate to the vehicle operator incessantly without interruption whenever the vehicle ignition switch is closed when the brake linings have worn to a predetermined point regardless of whether the brakes are being applied or not and regardless of the condition of the shoe-engaging surface of the brake drum.

The foregoing and other important objects and desirable features inherent in and encompassed by the invention, together with many of the purposes and uses thereof, will become readily apparent from a reading of the ensuing description in conjunction with the annexed drawing, in which, FIGURE 1 is an enlarged, fragmentary side elevational view, partially in section, illustrating the relationship of the brake shoe, lining and drum and the brake lining wear indicating means embodying the invention;

FIGURE 2 is a plan view of the brake drum-engaging surface of the brake lining taken substantially along line 2—2 of FIGURE 1;

FIGURE 3 is an enlarged, cross sectional view of the switch means utilized in the brake lining wear indicating means illustrated in FIGURE 1;

FIGURE 4 is a view similar to FIGURE 3 illustrating a modified form of the invention;

FIGURE 5 is a plan view of the brake lining wear indicating switch means illustrated in FIGURE 4;

FIGURE 6 is an enlarged, detailed view partially in section, of another form of the invention; and FIGURE 7 is a view similar to FIGURE 6 showing still another modification of the invention.

Referring to the drawing in detail, wherein like reference characters designate like elements and features throughout the various views, an arcuate portion of the generally cylindrical brake drum 10 of a conventional form of automotive wheel brake is shown. The brake drum 10 is generally carried by the vehicle wheel and is adapted to rotate therewith. The brake drum 10 is provided with a relatively stationary cover plate (not shown). A conventional form of automotive vehicle wheel brake usually includes a pair of generally semi-circular brake shoes 11, one of which is partially illustrated in FIGURE 1. The brake shoes 11 are mounted on the stationary part of the wheel brake assembly, such as the cover plate, and are normally spring-biased out of operative engagement with the brake drum 10. The brake shoes 11 are actuated or expanded by a suitable mechanical or hydraulic means (not shown) from the brake pedal of the vehicle.

As in conventional motor vehicle wheel brake assemblies, the brake shoe 11 is provided with a body of molded friction material commonly known as a brake lining 12. The brake linings 12 are usually rigidly secured to the outermost finished, semi-cylindrical surfaces 13 by means of a plurality of recessed rivets 14 or, alternatively by means of studs and cooperating lock nuts (not shown). In some instances rather than being riveted or bolted to the brake shoes, the brake linings 12 are bonded to the shoe surfaces 13. It is to be understood, that the invention is applicable to all vehicle wheel brake systems regardless of the manner in which the brake linings 12 are secured to the shoes 11. The brake linings 12 are adapted, upon application of the vehicle brakes, to move toward and into frictional engagement with the interior cylindrical surface 15 of the brake drum 10 to control rotation of the vehicle wheel.

As shown in FIGURES 1 and 2, the enlarged head 16 of each attaching rivet 14 is recessed or disposed below the original drum-engaging surface 17 of the brake lining 12. The distance the heads 16 of the rivets 14 are spaced from the surface 17 when first installed or after use obviously determines the useable life remaining in the brake lining since once the rivet heads 16 are exposed or flush with the surface 17 to such an extent that the lining has worn, application of the vehicle brakes will cause the relatively hard rivet heads 16 to score and damage the surface 15 of the brake drum 10. It is to be understood that when stud and nuts, rather than rivets 14, are utilized to attach the brake lining to the shoe as in the case of heavy duty motor truck vehicle wheel brake assemblies, the heads of the studs are recessed in the same manner that the heads 16 of the rivets 14 are recessed below the surface 17 of the lining 12 as pointed out above. In the case of bonded brake linings, it is possible for the lining 12 to wear completely through whereby application of the brakes causes a portion of the metal shoe surface 13 to engage the metal surface 15 of the drum 10 and score the same. Furthermore, it is possible that not only would the brake drum be damaged but the brake would fail to stop movement of the vehicle in an emergency.

Before the widespread use of automatic slack adjusters for motor vehicles became popular a vehicle operator periodically became aware of the condition of the vehicle brakes by a physical manifestation. As the linings became worn, the play or free travel of the brake pedal became greater. Thus, to compensate for the wear of the lining, the brakes would be periodically adjusted and the vehicle operator had some indication of the wear condition of the brake linings even through such indication was of questionable accuracy. It will be appreciated therefore, that prior to the present invention the only proper way the wear condition of vehicle wheel brake linings could be checked accurately was to disassemble the brake and actually view the linings. However, since brake linings are generally mounted in such a manner that they can not be readily and inexpensively inspected and there was no convenient way to determine the actual condition of the brake linings, there is a tendency for the average person to be negligent in the following of a brake inspection program.

Consequently, many vehicles are presently being operated which have brake linings on the verge of being worn away to such an unsafe extent that a failure could occur abruptly without warning. As stated hereinbefore, it is an important objective of the present invention to provide a simple, inexpensive yet highly effective means for indicating audibly and/or orally to an operator when the brake lining has been worn a predetermined amount. The brake lining wear indicating means, designated generally by numeral 18, includes an electrical switch 19. The housing 20 of the switch 19 illustrated in FIGURES 1 and 3 is formed to provide an elongated, generally cylindrical intermediate section 21 which has external screw threads 22 formed thereon. The housing 20 is made of electrical conductive metallic material such as brass or the like. One end of the cylindrical section 21 is defined by an enlarged, hexagonally shaped head 23 and the opposite end is provided with an integrally formed, generally cylindrical wall portion 24 of slightly smaller diameter than the intermediate section 21. As best illustrated in FIGURE 3, an axially extending passageway 25 has one end opening into a pocket 26 defined by the wall portion 24. The passageway 25 is formed in the intermediate section 21 and has the end thereof opposite the end opening into the pocket 26 in communication with one end of an elongated axially extending passageway 27. The passageway 27 extends through the head 23 and opens centrally and exteriorly thereof. The passageway 27 is of smaller diameter than the passageway 25 and, consequently, an annular shoulder 28 is formed at the juncture of the passageways 25, 27.

A small cylindrical block 29 of plastic or other electrical insulating material is disposed within the pocket 26. The innermost end of the block 29 abuts an annular shoulder 30 at the juncture of the wall portion 24 and the intermediate section 21 to limit inward movement thereof and the free edge 31 of the wall portion 24 is peened or rolled over the outermost end of the block 29 to maintain the block 29 assembled in the switch housing 20.

An elongated metal plunger, designated generally by numeral 32, is disposed within the switch housing 20. The plunger 32 is slidably supported by the surface defining the passageway 27 for relative movement along the longitudinal axis of the housing 20. The plunger 32 has a length greater than the length of the passageway 27 but shorter than the combined lengths of the passageways 25, 27. One end of the plunger is provided with a conically-shaped contact head 33 which is disposed within the passageway 25. The opposite end of the plunger 32 is in the form of a reduced-diameter, short section 34 having an integrally formed, generally semi-spherically shaped cap 35 on its free end. The metal material encircling the outermost opening of the passageway 25 is peened about the short section 35 beneath the cap 35. From the foregoing, it will be appreciated that when the plunger 32 is assembled in the housing 20 in this manner, it is incapable of moving axially with respect to the housing 20 and the contact head 23 is axially spaced from the block 29. The plunger 32 is made of a material which is much softer than the materials of which the conventional brake shoe is made and of which the usual brake lining securing rivets and studs are made. It is obvious, therefore that the plunger material is softer than the metal utilized in the surface 15 of a conventional brake drum 10. The purpose of forming the plunger 32 of comparatively soft material will be pointed out hereinafter. As shown in FIGURE 3, a helically wound compression spring 36 encircles the plunger section disposed within the passageway 25 and has one end bearing against the annular shoulder 28 at the juncture of the passageways 25, 27. The opposite end of the spring 36 reacts against the underside of the conical contact head 33. Consequently, the spring 36 tends to urge the plunger 32 axially with respect to the housing 20 in a direction to move the contact head 33 toward the block 29. However, as stated hereinbefore, as long as the plunger 32 and the housing 20 are interconnected as illustrated in FIGURE 3 with the semispherical cap 35 intact, the plunger 32 remains fixed with respect to the housing 20.

Molded into or otherwise suitably secured to the block 29 is a centrally located electrical contact element 37. As illustrated in FIGURE 3, the contact element 37 is electrically insulated from the metal switch housing 20 by the material of the block 29 and has one surface thereof exposed to the interior of the passageway 25. One end of an insulated wire or electrical conductor 38 is suitably attached to the contact element 37. The switch housing 20 is adapted to be mounted on a brake shoe 11 and this is accomplished by inserting the cylindrical threaded section 21 thereof through aligned openings 39 and 40 formed through the brake lining 12 and brake shoe 11, respectively. The opening 39 is sufficiently large enough to accommodate the enlarged head 23 of the housing 20 which bears against the surface 13 of the brake shoe 11. A washer 41 and a nut 42 threaded on the cylinder section 21 are employed for rigidly attaching the switch housing 20 to the brake shoe 11. Inasmuch as the switch housing head 23 and the brake shoe 11 are both made of metal, the switch housing 20 and brake shoe 11 are, in essence, electrically connected together. From the foregoing, it will be appreciated that when the switch housing 20 is first assembled on the brake shoe 11, the cap 35 of the plunger 32 is spaced a distance from the original brake drum-engaging surface 17 of the lining 12 which is slightly smaller than the spacing of the rivet heads 16 from the same surface 17.

The operation of the structure thus far described is believed obvious. As the vehicle wheel brakes are used, the brake linings 12 become worn and the wear on the brake linings 12 is evidenced by a decrease in the thicknesses of the linings 12. Eventually, the brake lining 12 will wear to such an extent that the plunger cap 35 will be flush or at the level of the drum-engaging surface 17 of the brake lining 12. Upon further use of the vehicle brakes thereafter and continued wearing of the brake lining 12, the relatively soft cap 35 is worn away by coming into frictional engagement with the drum surface 15. During the time the cap 35 is being worn away scoring of the drum surface 15 is avoided because, as pointed out above, the cap 35 is made of much softer material than the brake drum surface 15. It will also be appreciated that spacing relationship of the rivet heads 16 with respect to the cap 35 and the lining surface 17 is such, as pointed out hereinbefore, that the entire cap 35 must be worn away before the rivet heads 16 will be flush or at the level of the lining surface 17. Once the plunger cap 35 is completely worn away, the connection between the plunger 32 and the housing 20 for maintaining the contact head 33 spaced from the contact element and for preventing relative axial sliding movement therebetween is broken. When this condition occurs, the biasing action of the spring 36 imparts axial sliding movement to the plunger 32 and causes the contact head 33 to be firmly pressed into abutting engagement with the contact element 37. It will be appreciated that the contact head 33 will be maintained in abutting engagement with the contact element regardless of whether the brakes are being applied or not. This is an important feature of the invention as will be apparent presently.

The electrical alarm circuit of which the switch 19 is a part, includes a signal lamp bulb 43, which is preferably mounted in a socket (not shown) supported on the vehicle instrument panel (not shown) so as to be readily visible by the vehicle operator. The ground conductor 38 extends from contact element 37 and is electrically connected to one terminal of the signal lamp bulb 43. Electrical energy is delivered to the other terminal of the signal lamp bulb 43 by means of an insulated, single wire or conductor 44. The conductor 44 is electrically connected to one side of a storage battery 45 of the type generally employed in a motor vehicle. The vehicle ignition switch 46 is interposed in the conductor 44. As in conventional motor vehicle electrical systems, the other side of the storage battery 45 is grounded to the chassis frame (not shown). It is also to be understood that the housing 20 of the switch 19 is grounded as schematically illustrated in FIGURE 1. Grounding of the housing 20 is accomplished by virtue of the fact that the housing 20 is mounted directly on brake shoe 11 without interpositoning of any electrical insulation and the brake shoe 11, in turn, is similarly electrically connected to the chassis frame.

Operation of the brake lining wear indicating means described is believed obvious. During normal conditions of the motor wheel when the brake lining 12 is in good condition, the lamp bulb 43 is deenergized inasmuch as the switch 19 is in its opened condition, i.e. the contact head 33 is out of engagement with the contact element 37. When the brake lining 12 wears away to such a predetermined extent so as to approach an unsafe thinness and to shortly expose the heads 16 of the rivets 14, which are normally disposed in openings 47 of the lining 12, or heads of the lining attaching studs (not shown), the cap 35, prior to the reaching of such unsafe condition of the brake lining 12, is worn away by repeated engagement with the surface 15 of the brake drum 10 after being exposed and whenever the brake is applied. Once the cap 35 is worn away, the spring 36 causes the switch 19 to close inasmuch as the contact head 33 and contact element 37 are brought into electrical and physical engagement thereby. With the switch 19 closed, the electrical circuit for energizing the signal lamp bulb 43 is completed. From the foregoing it will be appreciated that the signal lamp bulb 43 will remain energized as long as the ignition switch 46 is closed as when the vehicle is in operation, regardless of whether the vehicle brake is thereafter applied or not.

Thus, the wear condition of the brake lining 12 is visually indicated to the vehicle operator and he is thereby appraised of the fact that should the brake lining 12 not be replaced or renewed shortly, damage to the brake drum surface 12 and/or failure of the brake to stop the vehicle will inevitably occur. While a signal lamp bulb 43 is shown utilized in the system 18, it is to be understood that an audible signalling device, such as a buzzer or a bell could be substituted therefor without departing from the spirit and scope of the invention.

In the embodiment of the invention described hereinbefore with reference to FIGURES 1, 2 and 3, the head 23 of the switch housing 20 is hexagonally shaped so as to permit the same to be gripped by a wrench or other tool in order to facilitate assembly of the switch 19 on the brake shoe 11. The underside of the head 23 also is clamped directly to the brake shoe surface 13 and, consequently, the switch housing 20, per se, does not assist the rivets in securing the brake lining 12 rigidly to the brake. The switch housing 48 of the modification of the invention shown in FIGURE 7 is interconnected to the brake lining 12 and brake shoe 11 in such a manner that the housing 48 and the means for securing the same to the brake shoe 11 assist the rivets or other means in securing the brake lining 12 to the brake shoe 11. The brake lining 12 is provided with a recess 49 extending from the drum-engaging surface 17 which has a size large enough to accommodate the head 50 of the housing 48. The recess 49 does not extend all the way through the lining 12 but rather is in communication with an opening 51 of smaller diameter than the recess 49. The size of the opening 51 is of a sufficient size to accommodate the passage of the cylindrical intermediate section 52 of the housing 48 therethrough. From the foregoing, it will be appreciated that the head 50 of the switch housing 48 is adapted to rest on the annular surface 53 defining the bottom of the recess 49 and when the lock nut 54 is drawn up tightly, the annular flange 55, formed by the recess 49 and opening 51, is firmly clamped between the head 50 of the switch housing and the brake shoe 11. Thus, the switch housing 48 and the means for mounting the same on the brake shoe 11 assist the rivets or other securing means in rigidly attaching the brake lining 12 to the brake shoe 11.

The embodiment illustrated in FIGURES 4 and 5 has particular utility when used in conjunction with the type of brake shoe assemblies employed in heavy duty trucks or the like. In conventional brake shoe assemblies for heavy duty trucks or the like, the brake lining 56 is attached to the brake shoe 57 by means of studs (not shown) which have a diameter somewhat larger than the diameter of a conventional lining attaching rivet 14. Consequently, the opening 58 formed through the brake shoe 57 for attaching the switch housing 59 thereto has a diameter which is the same as the diameter of each of the holes (not shown) for accommodating the attaching studs. Thus, no special drilling operations are necessary to modify the brake shoe 57 in order to incorporate the invention therein. The switch 60 illustrated in FIGURE 4 functions in the brake lining wear indicating means in the same manner as the switch 19 described herebefore and it is to be understood that the internal structure of the switch 60 is exactly the same as that of the switch 19. However, the head 61 of the housing 59 has a shape somewhat different from the heads 23 and 50 of switch housings 20 and 48, respectively. In plan, the uppermost surface 62 is generally circular and provided with a pair of diametrically disposed, oppositely extending slots 63. The head 61, which is generally in the form of a frustum of a cone, corresponds in size and shape to the head of a conventional brake lining attaching stud (not shown). The head 61 is adapted to be seated on an annular tapered surface 64 defining the bottom of each stud-receiving hole 65 in the brake lining 56. The housing 59 of the switch 60 is fixedly attached to the brake shoe 57 by means of a nut 66 and lock washer 67 as shown in FIGURE 4. From the foregoing, it will be appreciated that to incorporate the invention into the brake assembly of the type shown in FIGURE 4, it is merely necessary to substitute the switch 60 for one of the attaching studs. It is obvious that the switch 60 performs a dual function; i.e. an electrical circuit controlling means and as a brake lining attaching means. The surface of 62 of the switch housing head 61 is provided with slots 63 for receiving the tip portion of the blade of a modified screw driver (not shown) which is employed for facilitating the attachment of the switch 60 to the brake shoe 57.

The housing 68 of the switch 69 illustrated in FIGURE 6 is somewhat different in shape from the switch housings 20, 48 and 59 described hereinbefore inasmuch as the end thereof adjacent the plunger cap 35 is not provided with an enlarged head. An enlarged, hexagonally shaped head 70, instead, is integrally formed with the opposite end of the generally cylindrical, externally threaded intermediate section 71. Thus, the opening 72 formed through the brake lining 73 for receiving the portion of the intermediate section 71 of the switch housing 68 projecting from the brake shoe 11 is relatively small and need be only slightly larger in diameter than the intermediate section 71. An aperture 74 formed in the brake shoe 11 is coaxially disposed with respect to the lining opening 72 and is provided with internal screw threads. The elongated threaded section 71 is adapted to be screwed into the aperture 74 with a lock washer 76 and securing nut 75 disposed on the intermediate section between the brake shoe 11 and the head 70. From the foregoing it will be appreciated that by loosening the nut 75, the switch housing 68 may be rotated with respect to the brake shoe 11 to vary the extent the thread section 71 projects axially from the brake shoe 11. Thereafter by tightening the nut 75, the switch housing 68 will remain fixed in its axially adjusted position. Thus, the distance the plunger cap 35 is axially spaced beneath the drum-engaging surface of the brake lining 73 may be varied so as to space the plunger cap 35 closer to the drum-engaging surface of the brake lining 73 than the heads or the outermost surfaces of the particular lining attaching means employed. Thus, the embodiment of FIGURE 6 is universal in its application since it is adaptable to all types of brake assemblies regardless of the thickness of the brake linings encountered and the particular means utilized for attaching the brake linings to the shoes.

From the foregoing description, it will be obvious that the invention affords an indicating system of great simplicity. The indicating system will give a positive warning signal when the brakes have been worn away to a predetermined extent. There is absolutely no danger of a false signal, and no danger of undesirable current leakage from the storage battery. Furthermore, once the brake lining is worn away to such an extent so as to afford an indication, the alarm or warning signal is continuous as long as the vehicle is in operation and regardless of whether the brakes are applied or not.

The embodiments of the invention chosen for the purposes of description and illustration herein are those preferred for achieving the objects of the invention and developing the utility thereof in the most desirable manner, due regard being had to existing factors of economy, simplicity of design and construction, production methods, and the improvements sought to be effected. It will be appreciated, therefore, that the particular structural and functional aspects emphasized herein are not intended to exclude, but rather to suggest such other adaptations and modifications of the invention as fall within the spirit and scope of the invention as defined in the appended claims.

What is claimed is:

1. A brake lining wear indicating means comprising, a brake shoe; a brake lining of friction material fixedly secured to said brake shoe, said brake shoe being movable with respect to a brake drum to cause said lining to be moved into and out of frictional engagement with the brake drum; switch means carried by said brake shoe including a contact element and a relatively movable contact head, said switch means normally being open with said contact element and head spaced with respect to each other, said switch means closed when said contact element and head engage each other, said switch means closing only upon wear of said lining a predetermined amount, said switch means including biasing means yieldably urging said contact element and head relatively toward each other; and an electrical indicating circuit electrically connected to said switch means.

2. A brake lining wear indicating means as set forth in claim 1, further including adjustable means for selectively establishing the predetermined amount said lining must wear before said switch means closes.

3. A brake lining wear indicating means comprising, a brake drum; a brake shoe; a brake lining of friction material; means for rigidly securing said brake lining to a surface of said brake shoe, said brake shoe being movable with respect to said brake drum to cause a surface of said lining to be moved into and out of frictional engagement with said brake drum; switch means including a housing and contact element electrically insulated from said housing, said switch means further including a plunger mounted in said housing having one end provided with a contact head, said plunger being movable between a first position wherein said contact head is out of engagement with said contact element and a second position wherein said contact head engages said contact element, and releasable connecting means interconnecting said plunger and housing and maintaining said plunger in said first position, said connecting means being releasable to permit movement of said plunger to said second position upon wear of said lining a predetermined amount; means for mounting said switch means on said brake shoe; and an electrical indicating circuit connected to said housing and said contact element.

4. A brake lining wear indicating means as set forth in claim 3, further including adjustable means for selectively establishing the predetermined amount said lining must wear before said plunger is permitted to move to said second position.

5. A brake lining wear indicating means as set forth in claim 3, wherein said housing is provided with an enlarged head at one end, said head being disposed on one side of and spaced from said surface of said brake shoe when said switch means is mounted on said brake shoe, and said means for mounting said switch means on said brake shoe includes means for clamping said brake lining between said head and said surface of said brake shoe.

6. A brake lining wear indicating means comprising, a brake shoe; a brake lining of friction material fixedly secured to said brake shoe, said brake shoe being movable with respect to a brake drum to cause a surface of said lining to be moved into and out of frictional engagement with the brake drum; switch means including a housing and a contact element electrically insulated from said housing, said switch means further including a plunger mounted in said housing having one end provided with a contact head, said plunger being movable with respect to said housing whereby said contact head is movable into and out of engagement with said contact element, and releasable connecting means interconnecting said plunger and housing for preventing relative movement between said plunger and housing and for maintaining said contact head out of engagement with said contact element, said connecting means being releasable to permit relative movement between said plunger and housing and engagement of said contact head with said contact element upon wear of said lining a predetermined amount; means for mounting said switch housing on said brake shoe; and an electrical indicating circuit connected to said housing and said contact element.

7. A brake lining wear indicating means as set forth in claim 6, further including biasing means within said housing for resiliently urging said contact head into engagement with said contact element.

8. A brake lining wear indicating means comprising, a brake shoe: a brake lining of friction material fixedly secured to a surface of said brake shoe, said brake shoe being movable with respect to a brake drum to cause a surface of said lining to be moved into and out of frictional engagement with the brake drum; switch means including an elongated externally threaded housing and a contact element at one end of said housing, said contact element being electrically insulated from said housing, said switch means further including a plunger slidably mounted in said housing having one end provided with a contact head, said plunger being axially slidable with respect to said housing between a switch opened position wherein said contact head is out of engagement with said contact element and a switch closed position wherein said contact head is axially spaced and out of engagement with said contact element, biasing means for resiliently urging said plunger toward its switch closed position, and releasable connecting means for connecting said plunger to said housing in its switch opened position, said releasable connecting means being positionable intermediate said surface of said brake shoe and said surface of said lining, said connecting means being releasable to permit said biasing means to resiliently urge said plunger to said switch closed position upon wear of said lining a predetermined amount; means for mounting said switch means on said brake shoe so as to position said releasable connecting means between said surface of said brake shoe and said surface of said lining; and an electrical indicating circuit electrically connected to said plunger and said contact element.

9. A brake lining wear indicating means as set forth in claim 8, wherein said housing is provided with an enlarged head at the end thereof opposite said contact element, said enlarged head being spaced intermediate said surface of said brake shoe and said surface of said lining; and said means for mounting said switch means on said brake shoe including a nut threadable on the end of said housing disposed on the side of the surface of said brake shoe opposite said enlarged head, said nut being effective upon being tightened to clamp said lining between said enlarged head and said surface of said brake shoe.

10. A brake lining wear indicating means as set forth in claim 8, wherein said means for mounting said switch means on said brake shoe permits adjustment of said housing on said brake shoe to vary the spacing between said releasable connecting means and said brake shoe surface whereby the predetermined amount said lining must wear before said connecting means is released to permit said biasing means to resiliently urge said plunger to said switch closed position is selectively variable.

11. A brake lining wear indicating means as set forth in claim 10, wherein said releasable connecting means includes a reduced diameter short section at one end of said plunger, a generally semi-spherical cap integrally formed with said short section and disposed exteriorly of said housing when said plunger is in its switch opened position, said cap being of larger diameter than said short section, said cap abutting portion of said housing encircling said short section to limit movement of said plunger in one direction, and said biasing means resiliently urging said cap into engagement with said portion of said housing, said connecting means being releasable upon the wearing away of said cap by coming into frictional engagement with the brake drum.

12. A brake lining wear indicating means comprising, a brake shoe; a brake lining of friction material fixedly secured to an outermost surface of said brake shoe, said brake shoe being movable with respect to a brake drum to cause a surface of said lining to be moved into and out of frictional engagement with the brake drum, said lining and brake shoe having aligned openings formed therethrough, the opening in said brake shoe being provided with screw threads; switch means including a housing having an elongated, externally threaded section, and a contact element at one end of said threaded section, said contact element being electrically insulated from said housing, said switch means further including a plunger slidably mounted in said threaded section having one end provided with a contact head, said plunger being axially slidable with respect to said housing between a switch opened position wherein said contact head is out of engagement with said contact element, a helically wound compression spring encircling said plunger for resiliently urging said plunger toward its switch closed position; releasable connecting means for connecting said plunger to said housing in its switch opened position, said connecting means being disposed at the end of said housing threaded section opposite said contact element, said housing threaded section being threadable into said brake shoe threaded opening whereby said releasable connecting means is positionable intermediate said outermost surface of said brake shoe and said brake drum-engaging surface of said lining, said connecting means being releasable to permit said spring to resiliently urge said plunger to said switch closed position upon wear of said lining to an extent that said connecting means is at the level of said drum-engaging surface of said lining, said housing being rotatable with respect to said brake shoe to adjust the spacing of said connecting means with respect to said outermost surface of said brake shoe and said drum-engaging surface of said lining; means for releasably locking said housing in its adjusted position with respect to said brake shoe and preventing rotation thereof including a nut threaded on said elongated section of said housing; and an electrical indicating circuit electrically connected to said housing and said contact element.

13. A brake lining wear indicating means as set forth in claim 12 wherein said releasable connecting means includes a reduced diameter short section at one end of said plunger, a generally semi-spherical cap integrally formed with said short section and disposed exteriorly of said housing when said plunger is in its switch opened position, said cap being of larger diameter than said short section, said cap abutting a portion of said housing encircling said short section to limit movement of said plunger in one direction toward its switch closed position; and said spring resiliently urging said cap into engagement with said portion of said housing, said connecting means being releasable upon the wearing away of said cap by coming into frictional engagement with the brake drum.

References Cited by the Examiner
UNITED STATES PATENTS

| | | | |
|---|---|---|---|
| 2,146,357 | 2/1939 | Schweikle | 340—52 X |
| 2,217,176 | 10/1940 | Madison | 200—61.4 |
| 2,731,619 | 1/1956 | Fratus | 340—52 |
| 2,814,684 | 11/1957 | DePascale | 200—61.4 |

NEIL C. READ, *Primary Examiner.*

A. WARING, *Assistant Examiner.*